C. E. PENNY.
Improvement in Fly-Catchers.
No. 132,977.  Patented Nov. 12, 1872.
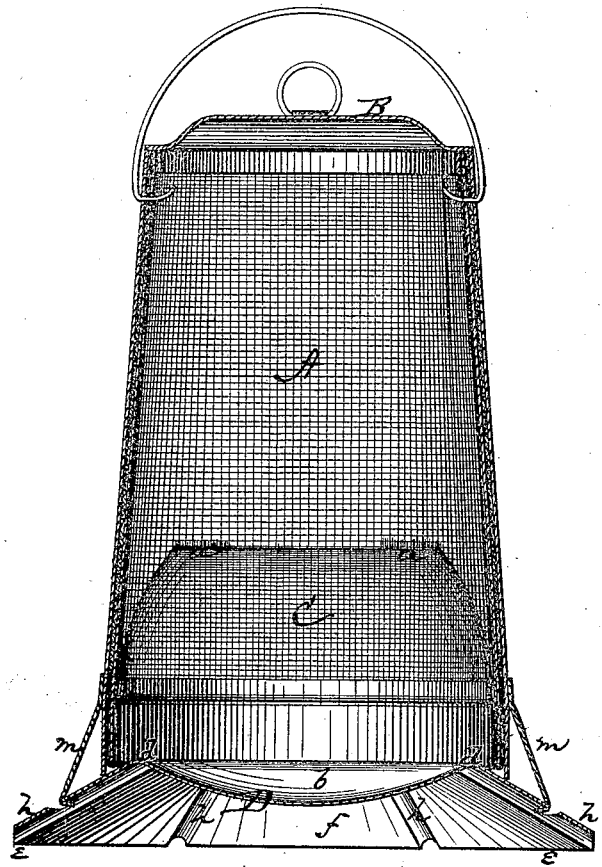
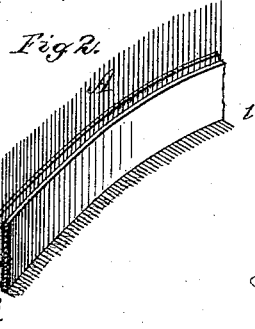
Witnesses
John A. Ellis
Wm. L. Ellis
Inventor
Charles E. Penny
Per
T. H. Alexander & Co
Att'ys

UNITED STATES PATENT OFFICE.

CHARLES E. PENNY, OF FORT WAYNE, INDIANA.

IMPROVEMENT IN FLY-CATCHERS.

Specification forming part of Letters Patent No. 132,977, dated November 12, 1872.

*To all whom it may concern:*

Be it known that I, CHARLES E. PENNY, of Fort Wayne, in the county of Allen and State of Indiana, have invented certain new and useful Improvements in Cockroach and Fly Catchers; and I do hereby declare that the following is a full, clear, and exact description thereof, reference being had to the accompanying drawing and to the letters of reference marked thereon which form a part of this specification.

My present invention is intended as an improvement upon the roach and fly trap for which Letters Patent were granted to me November 7, 1871; and it consists in the combination and arrangement of a receiving-chamber, decoy, and pan of peculiar construction, by which means a trap is formed to catch flies or roaches, as hereinafter more fully described and pointed out by the claim.

In order to enable others skilled in the art to which my invention appertains to make and use the same, I will now proceed to describe its construction and operation, referring to the annexed drawing, in which—

Figure 1 is a vertical section of my trap; and Fig. 2 is a section of the lower end of the receiving-chamber, showing the wires pointing inward and downward.

A represents the receiving-chamber with cover B, and C the decoy with metallic rim around its base, all constructed substantially in the same manner as described in my former patent above referred to. The decoy C is held in its place in the receiving-chamber either by friction or by any other suitable means. The openings $a\ a$ in the top of the decoy are made oblong, so that roaches as well as flies can readily crawl up through the same into the receiving-chamber. D represents the pan or basin pressed in oval form, so as to form a bait-cup, $b$, in the center, having a gradual descent from the ridge $d$, so that the center of the cup will be about three-quarters of an inch below said ridge. From the ridge $d$ the pan is inclined downward to the outer edge $e$, which edge should be about one inch below the ridge $d$. On this inclined part or rim $f$ of the pan are formed a series of ridges, $h\ h$, raised up from the surface, as shown, upon which the receiving-chamber will rest when placed on the pan, leaving plenty of room between said ridges for a fly or roach to pass under the edge of the receiving-chamber into the bait-cup $b$. The chamber A is held to the pan by means of spring-catches $m\ m$ fastened to the outside of the receiving-chamber, and catching in holes made for that purpose in some of the ridges $h$ or in the pan itself, if so desired. The points of the wire, of which the receiving-chamber A is made, are allowed to extend inward and downward from the base of the chamber, as shown at $i$, Fig. 2, so that there can be no possible chance of either flies or roaches crawling back from the bait-cup.

Having thus fully described my invention, what I claim as new, and desire to secure by Letters Patent, is—

The combination of the receiving-chamber A, decoy C, pan D with ridges $h\ h$, catches $m\ m$, and wire points $i\ i$, all constructed and arranged substantially as and for the purposes herein set forth.

In testimony that I claim the foregoing as my own I affix my signature in presence of two witnesses.

CHAS. E. PENNY.

Witnesses:
   JOHN G. ZIMMER,
   J. R. BITTENGER.